UNITED STATES PATENT OFFICE.

FREDERICK TSCHIRNER, OF NEWARK, NEW JERSEY.

PROCESS FOR EXTRACTING POTASSIUM SALTS.

1,254,451.   Specification of Letters Patent.   Patented Jan. 22, 1918.

No Drawing.   Application filed May 3, 1916.   Serial No. 95,102.

*To all whom it may concern:*

Be it known that I, FREDERICK TSCHIRNER, a citizen of the United States, residing at Newark, in the State of New Jersey, have invented certain new and useful Improvements in Processes for Extracting Potassium Salts; and I do hereby declare the following to be a full, clear, and exact description of the invention, such as will enable others skilled in the art to which it appertains to make and use the same.

My present invention relates to an improved process for the extraction of potassium salts from glauconite and allied minerals. This improved process has the advantages of avoiding the serious obstacles to successful commercial operation met with in other processes, as well as making cheap materials successfully available.

Glauconite is essentially a hydrous silicate of iron and potassium in which the iron is contained partly in the ferrous and partly in the ferric state. It follows, therefore, that such processes as employ acids in decomposition of this mineral are made difficult because the acids react first upon the iron oxids, and excess quantities of the acid must, therefore, be employed, to prevent the formation of difficultly soluble basic salts. This necessity for the use of a large excess of acid makes the use of acid processes impracticable for the commercial extraction of the potassium.

On the other hand there is an equally serious objection to the use of caustic oxids such as lime, or lime and fluorids. These require such a high temperature to become effective that the mineral begins to fuse, forming clinkers before the process is completed, thus rendering extraction of the potassium compounds very difficult and imperfect.

Another difficulty which has hitherto stood in the way of commercially utilizing glauconite as a source of potassium salts is found in the high cost of the reagents heretofore proposed. My process can be carried out with relatively common and cheap materials.

My process therefore combines the following advantages:

1st. The use of relatively cheap materials.

2nd. The formation of soluble potassium compounds without the production of soluble iron salts.

3rd. Completion of the essential reactions without using a temperature high enough to form clinkers by fusion of any of the constituents.

While my improved process makes the first advantage above named available, it may, of course, be carried out by means of more expensive substitutes for the reagents hereinafter named, without departing from the scope of my invention as set forth in the claims hereto appended.

In the practice of my invention in its preferred embodiment, I proceed as follows—

I mix one hundred (100) parts by weight of green sand marl (glauconite) with fifty (50) parts of lime sand (gray calcareous marl) and thirty (30) parts of calcium chlorid.

This mixture is submitted to a roasting temperature with access of air to a temperature of about eight hundred (800) to eight hundred and twenty (820) degrees celsius, care being taken to avoid a heat sufficient to form clinkers.

The first result of this roasting is to dehydrate the green sand and convert the calcium carbonate largely into calcium oxid. In the presence of the calcium oxid so formed, the calcium chlorid acts on the dehydrated green sand, whose ferrous salts have been converted into the ferric condition by oxidation and produces potassium chlorid. The lime also reacts with any soluble ferric salts, e. g. chlorid, to produce ferric oxid and calcium chlorid.

This mixture after roasting can then be leached either with or without powdering and the potassium chlorid can then be extracted.

As one modification of my process, I may produce calcium chlorid during the roasting process using such proportions as may be found convenient, and for this purpose I have found it practical to mix with one hundred (100) parts of green sand, sixty-five (65) parts of the lime sand and to pass over or through the material while being roasted hydrochloric acid in gaseous form and in sufficient quantities to convert about fifteen parts of the lime sand into calcium chlorid.

The material above referred to as "lime sand" or "gray calcareous marl," is a low grade of calcium carbonate material, which is found in some localities, in large beds, located near the green sand deposits. An analysis of a typical sample of this material gave the following results:

| | |
|---|---|
| Silica | 14.38% |
| Iron oxid and alumina | 6.72% |
| Carbonate of lime | 71.12% |
| Carbonate of magnesia | 3.81% |
| Potash | 0.48% |

It is obvious that instead of employing the lime sand, which I prefer for cheapness, I may mix the calcium oxid and calcium chlorid directly with the green sand, in which case twenty-five parts of calcium oxid can be mixed with one hundred parts of green sand and thirty (30) parts of calcium chlorid.

It is not essential to my invention that the lime and calcium chlorid should be added simultaneously. Either may be added after the other, and successive roasting with one after the other is within the invention.

My invention covers the use of the well known substitutes for the given reagents. For instance, instead of the calcium compounds named, I may use the corresponding compounds of magnesium or barium or other alkalis or alkaline earths. In my claims I include all of these under the expression "calcareous material" and "chlorid of an alkali-forming metal." The term "glauconite" covers this mineral and its recognized allied silicates whether found as green sand or otherwise.

What I claim is—

1. A process of obtaining soluble potassium compounds from a hydrous iron potassium silicate which comprises furnacing a mixture comprising such silicate, a finely divided calcareous material and a chlorid of an alkali-forming metal, at a temperature sufficient to convert the major part of the potassium content into a water-soluble state, but below that necessary to produce volatilization of any material amount of the potassium present, and below that necessary to produce clinkering of the mass.

2. A process for obtaining soluble potassium compounds from glauconite, which comprises furnacing a mixture comprising glauconite, a finely divided calcareous material and a chlorid of an alkali-forming metal, at a temperature sufficient to convert the major part of the potassium content into a water-soluble state, but below that necessary to produce volatilization of any material amount of the potassium present, and below that necessary to produce clinkering of the mass.

3. A process for obtaining soluble potassium compounds from an iron potassium silicate, which comprises furnacing a mixture comprising such silicate, lime sand, and a chlorid of an alkaki-forming metal, at a temperature sufficient to convert the major part of the potassium content into a water-soluble state, but below that necessary to produce volatilization of any material amount of the potassium present, and below that necessary to produce clinkering of the mass.

4. A process for obtaining soluble potassium compounds from iron potassium silicate, which comprises furnacing a mixture comprising such silicate, a finely divided calcareous material, and a chlorid of an alkali-forming metal, at a temperature of approximately 800 to 820° C.

5. In the production of soluble potassium compounds from hydrous iron potassium silicates, the step of heating a mixture of such a silicate, a calcareous material and a chlorid of an alkali-forming metal, such materials being proportioned in amounts corresponding to approximately 100 parts of green sand marl, 50 parts of lime sand and 30 parts of calcium chlorid, to render the potassium compounds soluble.

6. A process for obtaining soluble potassium compounds from glauconite, which comprises furnacing a mixture comprising glauconite, lime sand, and a chlorid of an alkali-forming metal, at a temperature of approximately 800 to 820° C.

In testimony whereof, I have affixed my signature.

FREDERICK TSCHIRNER.